(12) United States Patent
Smith (10) Patent No.: US 6,959,488 B2
(45) Date of Patent: Nov. 1, 2005

(54) METHOD FOR RETAINING A FIRST PART AGAINST A SECOND PART

(75) Inventor: Mark A Smith, Holdrege, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 10/668,729

(22) Filed: Sep. 23, 2003

(65) Prior Publication Data

US 2004/0069395 A1 Apr. 15, 2004

Related U.S. Application Data

(62) Division of application No. 09/814,349, filed on Mar. 21, 2001, now Pat. No. 6,643,225.

(51) Int. Cl.[7] .............................................. H01R 43/00
(52) U.S. Cl. ............................. 29/825; 29/846; 29/850
(58) Field of Search ........................... 29/564.4, 564.6, 29/825, 846, 850, 863

(56) References Cited

U.S. PATENT DOCUMENTS

| | | | |
|---|---|---|---|
| 4,476,629 A * | 10/1984 | Suzuki et al. ................. | 29/863 |
| 4,602,124 A * | 7/1986 | Santucci ...................... | 174/101 |
| 4,937,400 A * | 6/1990 | Williams ...................... | 174/95 |
| 5,668,351 A * | 9/1997 | Hanlon et al. ............. | 174/68.3 |
| 5,677,513 A * | 10/1997 | Ito et al. .................... | 174/72 A |
| 5,739,470 A * | 4/1998 | Takeda ........................ | 174/97 |
| 5,862,290 A * | 1/1999 | Burek et al. ................ | 385/135 |
| 6,160,786 A * | 12/2000 | Coffin et al. ............. | 369/30.43 |
| 6,598,497 B1 * | 7/2003 | Mitzushima et al. ........ | 81/9.41 |
| 6,893,162 B2 * | 5/2005 | Vegny et al. ................. | 385/59 |

* cited by examiner

Primary Examiner—Carl J. Arbes (57) ABSTRACT

A system and method are disclosed which utilize a retaining mechanism to retain a first part against a second part in a manner that supplements or supplants use of adhesive. A retaining mechanism retains a first part against the surface of a second part, wherein the second part comprises a rib that is spatially separated from and oriented over such surface. The retaining mechanism is arranged tightly between the rib and the first part to impart force against the first part to retain it against the surface of the second part. In one implementation, the retaining mechanism is utilized to secure an illuminator cable against the surface of a lid assembly within a media picker device. For instance, a retaining mechanism may be arranged to fit tightly between a rib of the lid assembly and an illuminator cable to retain such illuminator cable against the surface of the lid assembly.

17 Claims, 4 Drawing Sheets

METHOD FOR RETAINING A FIRST PART AGAINST A SECOND PART

CROSS-REFERENCE TO RELATED APPLICATIONS

This application is a Divisional Application of and commonly assigned application Ser. No. 09/814,349, filed Mar. 21, 2001 now U.S. Pat. No. 6,643,225 entitled "SYSTEM FOR RETAINING A FIRST PART AGAINST A SECOND PART", the disclosure of which is hereby incorporated herein by reference. It is also related to commonly assigned U.S. design patent application Ser. No. 29/138,918, entitled "DESIGN PATENT APPLICATION FOR A RETAINING MECHANISM FOR RETAINING A FIRST PART TO THE SURFACE OF A SECOND PART", the disclosure of which is hereby incorporated herein by reference.

TECHNICAL FIELD OF THE INVENTION

This invention relates in general to a system and method for retaining a first part to the surface of a second part and more specifically to such a system and method utilizing a retaining mechanism to hold parts together to supplement or supplant use of adhesive for such retaining, and even more specifically to a system and method which utilizes a retaining mechanism for retaining an illuminator cable to the surface of a lid assembly within a media picker.

DESCRIPTION OF RELATED ART

Many different types of devices exist in which one or more components need to be retained to the surface of another component. For instance, many electronic devices exist in which data carrying and/or current carrying cables are included, which need to be retained to a particular surface so that the cables do not interfere with operation of the device (e.g., do not interfere with moving components of the device). Cables (or other components) are sometimes arranged within devices in a manner such that they are under stress. For example, a cable may be bent or twisted within a device to form the desired arrangement. Because the cables may be arranged such that they are under stress, it may be necessary to implement a mechanism to offset such stress in order to retain the cables in a desired configuration. For instance, it may be desirable to arrange a cable within a device such that it is bent in various directions, while at least a portion of the cable is maintained against a particular surface within the device. Because of the stress that the bending of the cable presents, the cable may tend to lift away from the particular surface against which it should be maintained. Therefore, it may be necessary to implement a mechanism to aid in maintaining the cable in the desired configuration (e.g., against the particular surface).

Various techniques have been utilized in the prior art for maintaining cables (or other components) to a particular surface. Primarily, adhesives have been utilized for adhering cables to a particular surface. However, various adhesives have proven unsuccessful over a relatively long period of time. For example, an adhesive may, over time, fail to maintain a stressed cable against a particular surface. Additionally, an adhesive may be sensitive to environmental conditions which a device may encounter, Such as temperature changes, dirt, etc., which may result in failure of the adhesive. Furthermore, problems may arise when manufacturing a device using an adhesive. For instance, an adhesive may require special handling/disposal instructions (e.g., which may be required because of the adhesive*s toxicity). Additionally, the adhesive may require a period of time to "set" (or harden) once a cable is arranged in a desired position. Thus, other mechanisms may be required to temporarily hold the cable in place while the adhesive hardens. Therefore, the use of adhesive in this manner may introduce difficulty and time delay in the manufacturing process.

BRIEF SUMMARY OF THE INVENTION

The present invention is directed to a system and method which utilize a retaining mechanism to retain a first part against a second part in a manner that supplements or supplants use of adhesive. According to at least one embodiment, a retaining mechanism for retaining a first part against a second part is disclosed, wherein the second part comprises a surface against which the first part is to be retained and a rib positioned partially above the second part. The retaining mechanism of such embodiment comprises substantially a monkey-wrench shape arranged between the rib and the first part to impart force against the first part to retain the first part against the surface of the second part. The monkey-wrench shape comprises a handle portion and at least a first fixed jaw portion, wherein such first jaw portion is arranged to engage a nib protruding from the surface of the second part. The retaining mechanism further comprises a complementary surface arranged to fit tightly against the rib.

According to at least one other embodiment, a method of retaining an illuminator cable assembly against a surface of a lid assembly within a media picker device is disclosed, wherein the lid assembly comprises a rib that is spatially separated from the surface and is oriented above at least a portion of the surface. The method of at least one embodiment comprises the steps of positioning the illuminator cable assembly on the surface of the lid assembly, and arranging a retaining mechanism between the rib and the illuminator cable assembly in a manner such that the retaining mechanism applies sufficient force against the illuminator cable assembly to retain the illuminator cable assembly against the surface.

In at least one embodiment, a retaining mechanism is disclosed, which is utilized in a media picker assembly. More specifically, a media picker assembly is disclosed that comprises a lid assembly, and an illuminator cable assembly that includes a surface and a rib spatially separated from at least a portion of such surface and oriented above at least a portion of such surface. The media picker assembly further comprises means for retaining the illuminator cable assembly against the surface of the lid assembly, wherein the retaining means is arranged between the rib and the illuminator cable assembly to maintain force against the illuminator assembly toward the surface.

DETAILED DESCRIPTION

Various embodiments of the present invention provide a system and method which utilize a retaining mechanism to retain a first part against a second part in a manner that supplements or supplants use of adhesive. According to at least one embodiment, a retaining mechanism is provided for retaining a first part against the surface of a second part, wherein the second part comprises a rib that is spatially separated from and oriented over such surface. In at least one embodiment, the retaining mechanism is arranged tightly between the rib of the second part and the first part to impart force against the first part to retain it against the surface of the second part. Accordingly, the retaining mechanism makes use of features (e.g., the rib) of the second part to retain the first part thereto.

As an example, the retaining mechanism of various embodiments is particularly useful within a media picker device to secure an illuminator cable against the surface of a lid assembly. For instance, the lid assembly of a media picker device may comprise a surface to which an illuminator cable is to be secured, and such lid assembly may further comprise a rib oriented above and spatially separated from such surface. A retaining mechanism according to various embodiments of the present invention may be arranged to fit tightly between the rib and the illuminator cable to retain such illuminator cable against the surface of the lid assembly in a desired manner. Thus, the retaining mechanism may comprise a complementary surface for engaging the rib in a manner that achieves a tight fitting therebetween. The surface of the lid assembly to which the illuminator cable is to be retained may be ramped such that when the illuminator cable is properly retained thereto, one or more light emitting diodes coupled to the illuminator cable are positioned to direct light in a desired manner.

According to at least one embodiment, the retaining mechanism may have substantially a monkey-wrench shape comprising a handle portion and at least one fixed jaw portion. The jaw portion is arranged to engage a nib protruding from the surface of the lid assembly to provide positional stability to the retaining mechanism in at least one direction. The retaining mechanism may further include a protruding member that protrudes from the handle portion of the retaining mechanism and arranged to engage a notch of the lid assembly to further aid the retaining mechanism in imparting force against the illuminator cable. The retaining mechanism may be formed of any suitable material (preferably non-conducting material), such as polycarbonate material.

While various embodiments are described herein for retaining an illuminator cable to the surface of a lid assembly of a media picker device, it should be understood that such various embodiments may be utilized to retain an illuminator cable to a surface within any other type of device. Additionally, it should be understood that various embodiments for a retaining mechanism may be utilized to retain other types of cables (or other components) to a surface within a device, and any such implementation is intended to be within the scope of the present invention.

Thus, various embodiments of the present invention disclose a retaining mechanism, which may, for example, be used in retaining a cable against a particular surface. An example of a device in which it may be particularly desirable to have a cable retained to a surface is a "juke box" data storage system, such as that disclosed in U.S. Pat. No. 6,160,786 entitled "CARTRIDGE ENGAGING ASSEMBLY WITH RACK DRIVE THUMB ACTUATOR SYSTEM." Many different types of juke box data storage systems exist and are used to store media (e.g., digital linear tapes (DLTs), linear tape open (LTO) tapes, or other types of data cartridges) at known locations and retrieve desired media so that data may be written to or read from such desired media by a host computer system.

A typical juke box data storage system may include one or more different types of media storage mechanisms, such as a cartridge storage rack that provides a storage location for data cartridges, which may together form a media "library." If a host computer system issues a request for data contained on a particular media within the library, a control system associated with the data storage system actuates the positioning system to move a media access device along the storage mechanism (e.g., storage rack) until the media access device is positioned adjacent to the desired media (e.g., the desired data cartridge). A "picker assembly" may be utilized to engage a selected data storage media and withdraw it from the storage mechanism (e.g., storage rack) and insert the media to a read/write device, and the "picker assembly" may perform the reverse as well in order to return a data storage media from the read/write device to its proper location on the storage mechanism.

To select the desired data storage media requested by the host computer system, a picker assembly may include a mechanism for reading bar codes (or other form of identification) associated with each data storage media included in the media library, for example. Additionally, an illuminator cable may be arranged within the picker assembly for illuminating the bar codes in a manner that allows for proper reading thereof by the bar code reader. For instance, LEDs may be arranged on a cable in a manner that provides proper illumination of the bar codes for accurate reading by the bar code reader. An example of such an illuminator cable assembly is further disclosed in U.S. patent application Ser. No. 09/814,269 entitled "METHOD AND APPARATUS FOR EVEN ILLUMINATION OF A TARGET FOR IMAGE CAPTURE." Embodiments of the present invention are described hereafter as implemented within a media picker. However, it will be recognized that many other devices exist in which embodiments of the present invention may be implemented, and any such implementation is intended to be within the scope of the present invention. Thus, the present invention is not intended to be limited only to the exemplary implementations within a media picker provided herein, rather such implementations are intended as examples that render the disclosure enabling for implementation within many other devices.

Figure 1:
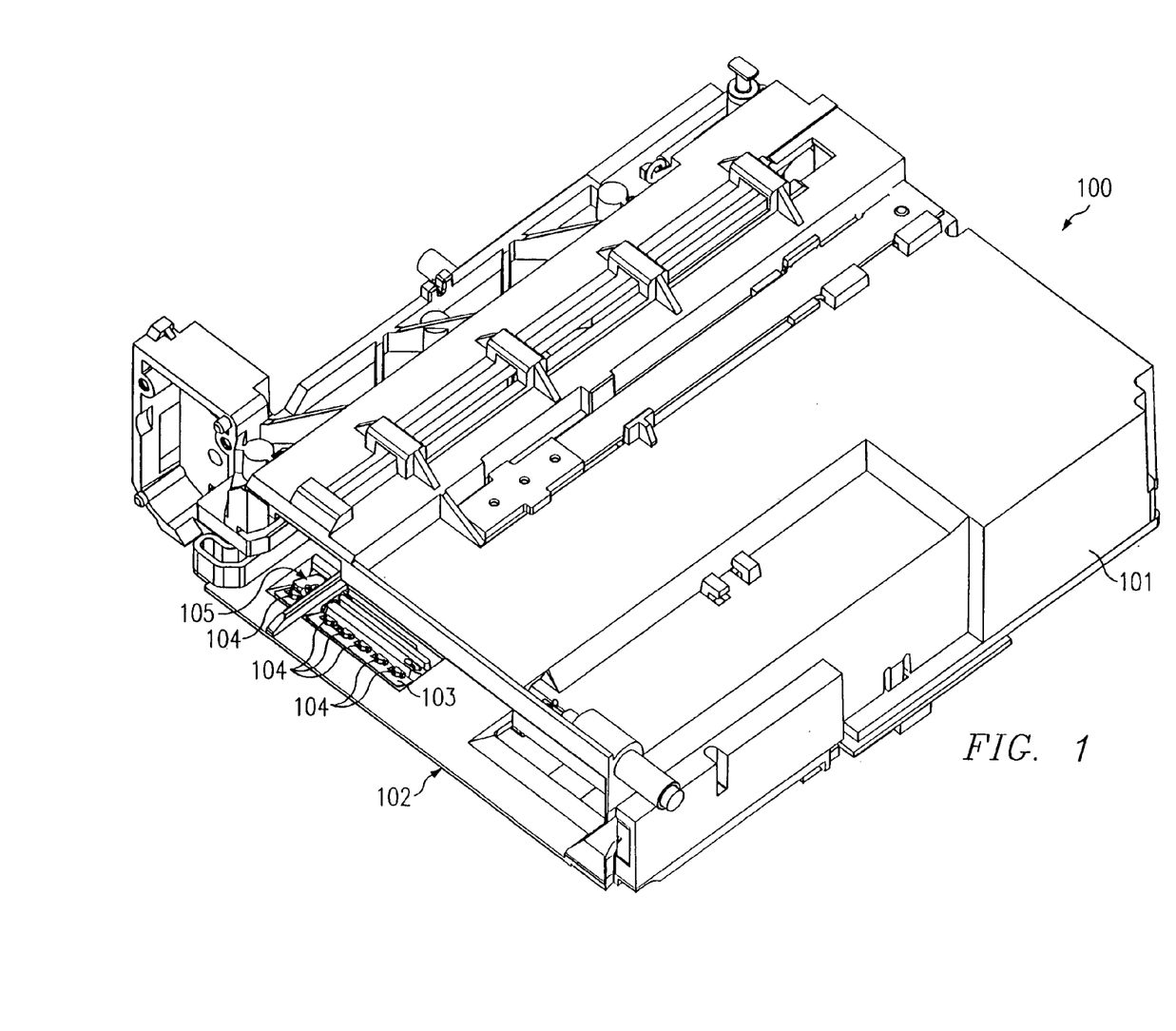
FIG. 1 shows a media picker assembly as an example of a device in which embodiments of the present invention may be implemented.

Turning to FIG. 1, an exemplary media picker assembly 100 is shown, in which various embodiments of the retainer mechanism of the present invention may be implemented. As shown, media picker assembly 100 includes casing 101 that encases various components of the assembly. Media picker assembly 100 further includes "lid assembly" 102, cable 103, and light emitting diodes (LEDs) 104. LEDs 104 are soldered to cable 103, which is the current carrying conductor for such LEDs 104. Cable 103 may be referred to herein as an illuminator cable because LEDs 104 are arranged thereon to provide desired illumination. More specifically, LEDs 104 are arranged to illuminate bar codes (or other form of identification) associated with data storage media to enable a reader included within media picker assembly 100 to accurately read such bar codes. Cable 103 may be of any suitable conducting material. For example, in one implementation, cable 103 comprises copper sandwiched between layers of polymide adhered thereto. Further shown in FIG. 1 is one embodiment of retaining mechanism 105 that aids in retaining cable 103 in a desired configuration.

Figure 2:
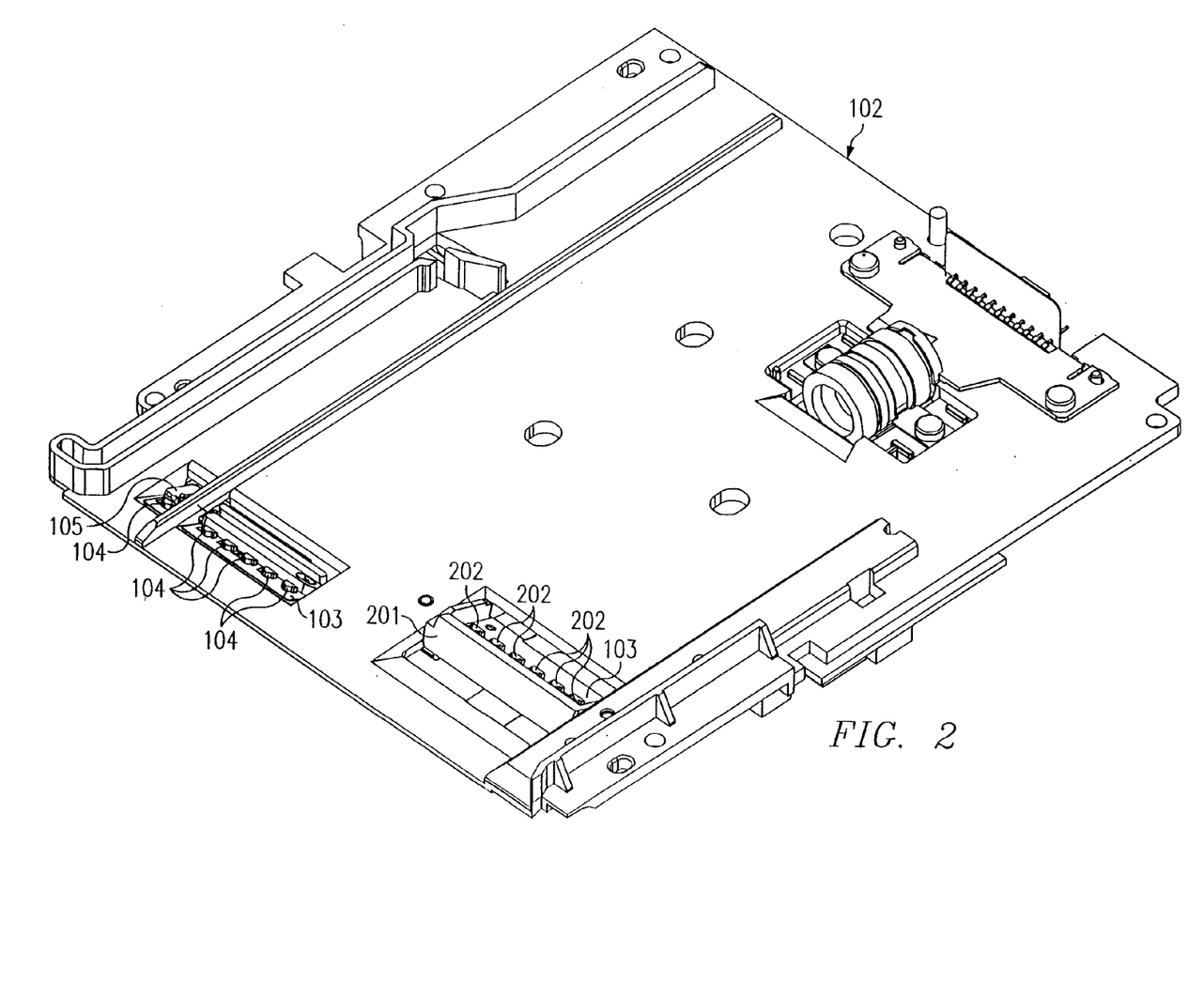
FIG. 2 further illustrates a lid assembly of a media picker, wherein a retainer mechanism may be implemented to maintain an illuminator cable against the surface of such lid assembly.

Casing 101 is not shown in FIG. 2, thereby allowing one implementation of lid assembly 102 to be further illustrated. The first set of LEDs 104 arranged on cable 103 are again shown in FIG. 2. As further shown, cable 103 may be configured (e.g., bent) in a manner (as shown more fully in FIG. 3) with a second set of LEDs 202 arranged thereon at another location of lid assembly 102. That is, cable 103 may be bent, twisted, and otherwise contorted beneath lid assembly 102 to position LEDs 104 and 202 at desired locations of lid assembly 102. Such second set of LEDs 202 may further provide illumination of bar codes (or other form of identification) associated with data storage media to enable a bar code reader included within the media picker assembly to accurately read such bar codes. Lens 201 may be included to aid in focusing the light of LEDs 202 in a desired manner. While not included in this implementation, in other implementations a retaining mechanism (such as retaining mechanism 105) may be arranged near the second set of LEDs 202 to aid in retaining cable 103 against the surface of lid assembly 102 in a manner similar to that shown for the first set of LEDs 104. Also, while not included in this implementation, in other implementations a lens (such as lens 201) may be arranged to focus the light generated by the first set of LEDs 104 in a manner similar to that shown for the second set of LEDs 202.

Figure 3:
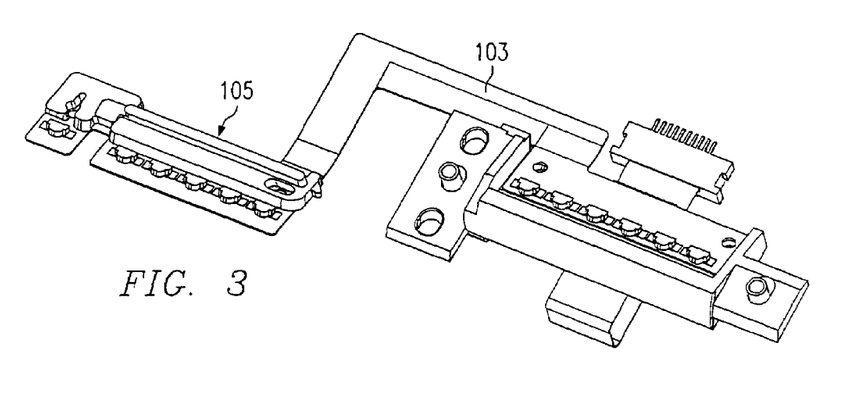
FIG. 3 shows an exemplary configuration of an illuminator cable bent and contorted in a manner that introduces stress within such cable.

FIG. 3 shows an exemplary configuration of cable 103 being bent and contorted in a manner that introduces stress within such cable 103. Because of such stress, cable 103 may tend to lift away from the surface of lid assembly 102 in locations where it is desirable to have cable 102 maintained against such surface. It is of particular importance in the media picker assembly that cable 103 be retained in a desired manner because of LEDs 104 arranged thereon. That is, it is important that LEDs 104 are maintained in a configuration such that they are directed toward a proper point for illuminating bar codes. Further, it is of particular importance that the portion of cable 103 on which LEDs 104 are arranged is retained to the surface of 102 in a desired manner. For instance, if the portion of cable 103 on which LEDs 104 are arranged were to pull away from the surface of lid assembly 102 (in response to the stress present in cable 103), the LEDs may fail to properly illuminate their intended target (e.g., bar codes associated with data storage media), which would negatively impact the operation of the media picker assembly. Additionally, if cable 103 were to pull away from the surface of lid assembly 102, it may be damaged and/or interfere with operation of media picker 100. For example, in one embodiment, selected data storage media is grabbed by picker assembly 100 such that the data storage media is inserted herein on lid surface 102 relatively close to LEDs 104. Thus, if the portion of illuminator cable 103 that includes LEDs 104 lifts off of the surface of lid assembly 102, it may interfere with a grabbed data storage media. Thus, in at least one embodiment, retaining mechanism 105 is arranged relatively near LEDs 104 to ensure that the portion of cable 103 on which LEDs 104 are arranged is retained to the surface of lid assembly 102 in a desired manner.

As described in greater detail hereafter, in at least one embodiment, retaining mechanism 105 is implemented so as to make use of features available on lid assembly 102 to retain illuminator cable 103 to a portion of the surface of lid assembly 102. In this manner, retaining mechanism 105 may supplement or supplant use of adhesive for retaining illuminator cable 103 to the surface of lid assembly 102.

Figure 4:
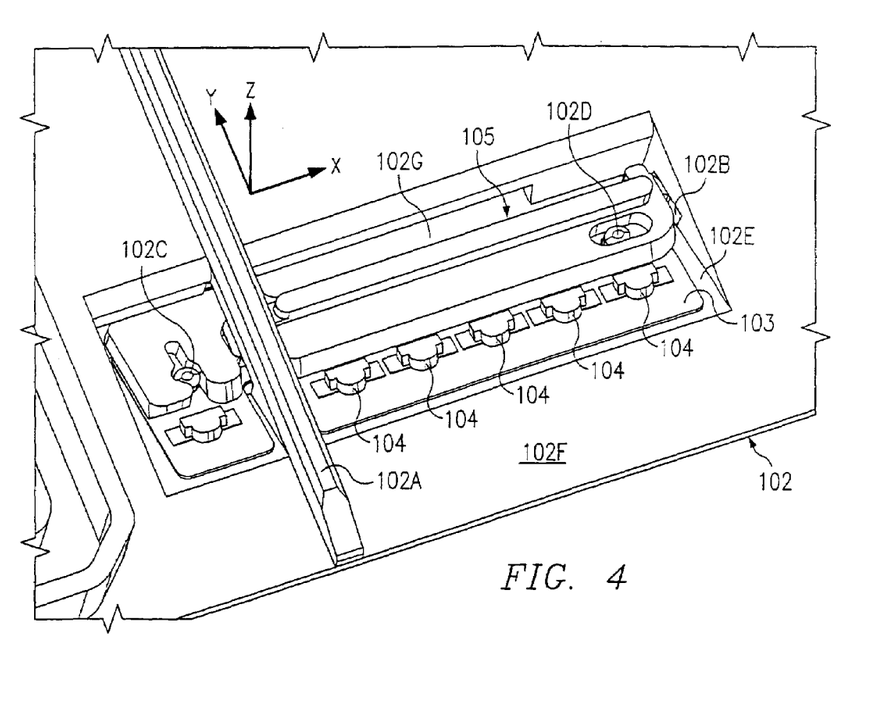
FIG. 4 shows a retaining mechanism implemented according to one embodiment of the present invention for retaining an illuminator cable against a surface of a lid assembly of a media picker.

Turning now to FIG. 4, retaining mechanism 105 implemented according to one embodiment of the present invention is shown in greater detail. As shown, retaining mechanism 105 retains illuminator cable 103 comprising LEDs 104 to the surface of lid assembly 102. In this example, lid assembly 102 comprises a ramped surface 102E to which the portion of illuminator cable 103 having LEDs 104 arranged thereon is retained. Ramped portion 102E is at a decline relative to main surface 102F of lid assembly 102 in order to properly direct LEDs 104 to illuminate an intended target (e.g., bar codes associated with data storage media). Further, in this example, lid assembly 102 comprises rib 102A that is arranged over ramped portion 102E. More specifically, in this example, rib 102A bridges main portion 102F across ramped portion 102E. In one embodiment, rib 102A provides a surface on which grabbed media may be positioned. Further, in at least one embodiment, rib 102A serves as a guiding feature for a "thumb" (not shown) of media picker assembly 100, which is a mechanism that moves in and out of media picker assembly 100 to grab media and pull the media into media picker 100 and to push media out of media picker 100.

The implementation of FIG. 4 is shown in three dimensions X, Y, and Z, with X being the width in the horizontal plane, Y being the length in the horizontal plane, and Z being the height in the vertical plane. Such X, Y, and Z labels are merely used for reference in FIG. 4, and all references used herein for describing orientation (e.g., front, back, right, left, etc.) are merely for reference, as various embodiments may be disposed in any manner desired. In the example of FIG. 4, ramped surface 102E slopes downward along the length (Y) of lid assembly 102 such that the portion of surface 102E over which LEDs 104 are arranged has a greater height Z than the portion of surface 102E over which retaining mechanism 105 is arranged. Rib 102A is arranged to cross ramped surface 102E lengthwise (in the Y direction). Thus, in this example, rib 102A crosses ramped surface 102E in the direction of the slope of such ramped surface 102E. As further shown in the example of FIG. 4, ramped surface 102E includes nibs 102C and 102D protruding therefrom. Lid assembly 102 further comprises notch 102B and an opening 102G.

In the example of FIG. 4, retaining mechanism 105 is implemented in a manner such that it can utilize features available on lid assembly 102 to advantageously retain illuminator cable 103 against ramped surface 102E. For example, retaining mechanism 105 is tightly wedged between rib 102A and illuminator cable 103 to maintain force against illuminator cable 103 in order to retain it against ramped surface 102. That is, by arranging retaining mechanism 105 to tightly fit between rib 102A and illuminator cable 103, retaining mechanism 105 maintains force against illuminator cable 103 to retain it vertically (in the Z plane). In the example of FIG. 4, rib 102A is arranged off-center of ramped surface 102E toward the left side of such ramped surface 102E. Although, in other implementations rib 102A may be arranged substantially centered relative to ramped surface 102E or arranged toward the right side of ramped surface 102E, and any such implementation is intended to be within the scope of the present invention. Because rib 102A is arranged off-center of ramped surface 102E nearer one side of such ramp (e.g., nearer the left side of ramped surface 102E), retaining mechanism 105 makes use of notch 102B of lid assembly 102 to aid in supplying force to retain illuminator cable 103. That is, notch 102B is arranged on the right side of ramped surface 102E, while rib 102A is oriented off-center toward the opposite side (the left side) of ramped surface 102E. More specifically, at least one embodiment of retaining mechanism 105 includes a protruding member (described in further detail in conjunction with FIGS. 5A–5C) that engages notch 102B to aid in retaining illuminator cable 103 against ramped surface 102E. That is, a protruding member of retaining mechanism 105 fits tightly against the upper edge of notch 102B, which results in retaining mechanism 105 maintaining force against illuminator cable 103 to retain such cable against ramped surface 102E.

In the example of FIG. 4, retaining mechanism 105 also utilizes nibs 102C and 102D. More specifically, retaining mechanism 105 engages nibs 102C and 102D to stabilize such retaining mechanism in the horizontal plane (i.e., in the X and Y directions). Nibs 102C and 102D may be provided as positioning nibs that aid in properly positioning the portion of illuminator cable 103 that includes LEDs 104 onto ramped surface 102E. For instance, apertures may be included on illuminator cable 103 such that when nibs 102C and 102D thread such apertures LEDs 104 are properly arranged on ramped surface 102E. By engaging nibs 102C and 102D, retaining mechanism 105 may be maintained in a proper position for retaining illuminator cable 103 against ramped surface 102E.

Figure 5A:
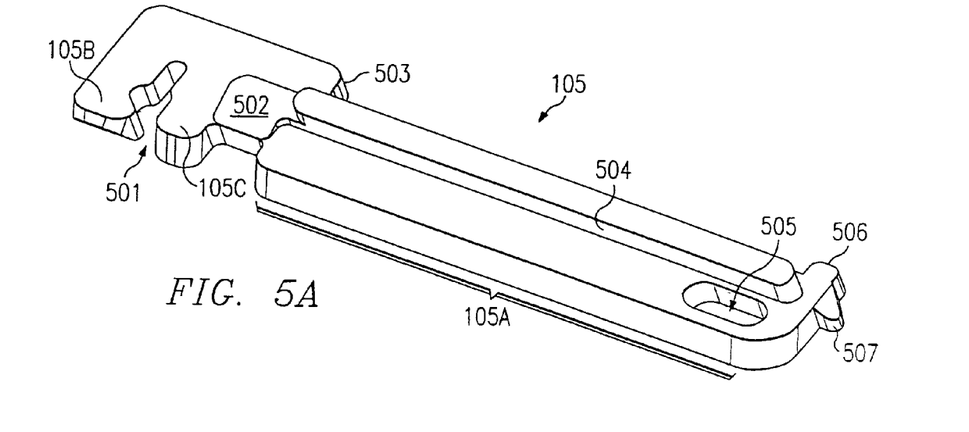
FIGS. 5A–5C show one embodiment of a retainer mechanism of the present invention in greater detail.
Figure 5B:
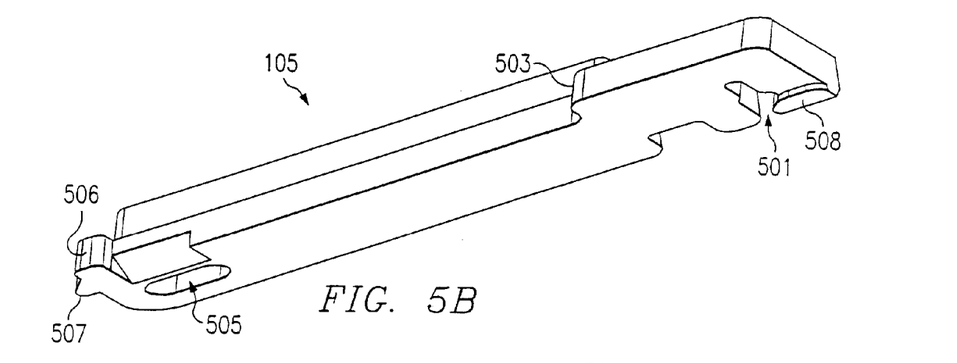
Figure 5C:
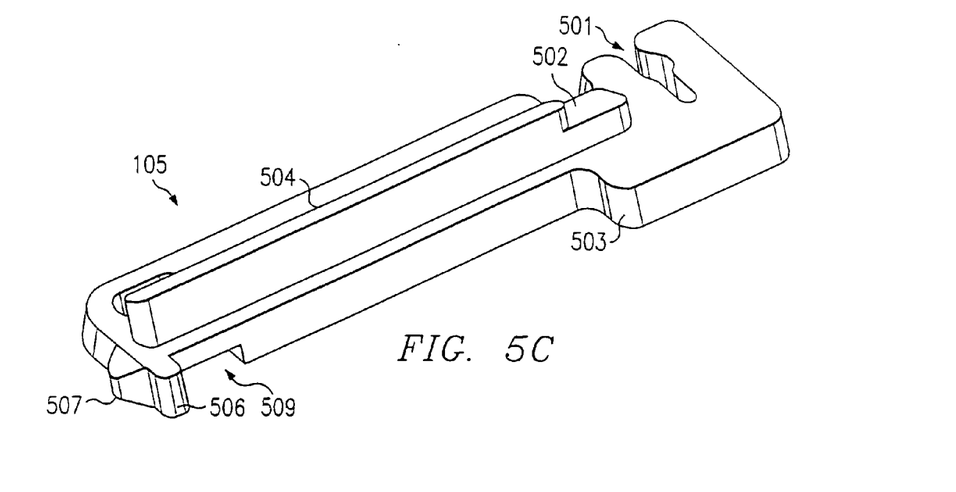

Turning now to FIGS. 5A–5C, one embodiment of retaining mechanism 105 is further shown. FIG. 5A provides an isometric view of retaining mechanism 105 from the front showing the front, top, and right sides thereof. FIG. 5B provides an isometric view of retaining mechanism 105 from the back showing the back, bottom, and left sides thereof. FIG. 5C provides an isometric view of retaining mechanism 105 from the back showing the back, top, and right sides thereof. In this exemplary embodiment, retaining mechanism 105 includes notch 501, complementary surface 502 (which may be referred to as rib "engaging surface" 502), shaped back portion 503, ridge portion 504, aperture 505, bumper 506, and protruding member 507. Retaining mechanism 105 further comprises elevational pad 508 (FIG. 5B), and cut-out portion 509 (FIG. 5C). As illustrated in FIGS. 5A–5C, in this exemplary embodiment, retaining mechanism 105 comprises substantially a monkey-wrench shape having an elongated handle 105A with aperture 505 included therein and fixed jaws 105B and 105C that form notch 501. Protruding member 507 extends lengthwise from the end of handle 105A of such monkey-wrench implementation. As described more fully below, in some embodiments, retaining mechanism 105 may include only one jaw (e.g., may include only upper jaw 105B). Various embodiments of retaining mechanism 105 having an elongated handle portion with at least one jaw portion forming notch 501 may be referred to herein as having substantially a "monkey-wrench" design. In at least one embodiment, retaining mechanism 105 is formed of polycarbonate material, although in other embodiments any suitable material may be utilized in forming retaining mechanism 105, including without limitation any suitable nylons or plastics. Most preferably, retaining mechanism 105 is formed of a substantially non-conducting material. In one embodiment, retaining mechanism 105 is approximately 2 millimeters thick, although in other embodiments it may have any suitable thickness that provides a sufficiently tight fit between features of lid assembly 102 and illuminator cable 103.

In operation, notch 501 engages nib 102C of lid assembly 102. That is, notch 501 engageably fits (or "snaps") against nib 102C of lid assembly 102 to provide positional stability to retaining mechanism 105 in the horizontal plane (in the X and Y directions). Aperture 505 engages nib 102D of lid assembly 102 to further provide positional stability to retaining mechanism 105 in the horizontal plane (in the X and Y directions). In this embodiment, aperture 505 comprises an elliptical shape, which aids in the process of coupling retaining mechanism 105 to lid assembly 102, as described more fully below. In other embodiments, aperture 505 may be of any suitable shape, and in some embodiments aperture 505 may be omitted from retaining mechanism 105, thereby relying on notch 501 for positional stability in the horizontal plane.

Complementary surface 502 tightly engages rib 102A of lid assembly 102 (as shown in FIG. 4) to provide force against illuminator cable 103 to retain such cable 103 against ramped surface 102E. As shown in FIGS. 5A and 5C, complementary Surface 502 may be sloped in a manner complementary with rib 102A (and sloped surface 102E) in a manner that aids positioning of retaining mechanism 105 tightly against rib 102A. In alternative embodiments, surface 102E may be substantially flat (not ramped) and complementary surface 502 of retaining mechanism 105 may be substantially flat, rather than sloped. That is, in various alternative embodiments complementary surface 502 may be arranged in any suitable manner (e.g., sloped or flat) such that it tightly engages the underside of rib 102A.

Protruding member 507 engages the upper edge of notch 102B of lid assembly 102 (as shown in FIG. 4) to further provide force against illuminator cable 103 to retain such cable 103 against ramped surface 102E. Thus, in this embodiment, complementary surface 502 engaging rib 102A and protruding member 507 engaging notch 102B act to provide the force necessary to retain illuminator cable 103 against ramped surface 102E. In alternative embodiments, either of complementary surface 502 engaging rib 102A or protruding member 507 engaging notch 102B may be omitted from retaining mechanism 105, and thereby rely on the other (non-omitted) component to provide the force necessary to retain illuminator cable 103 against ramped surface 102E. For instance, particularly in embodiments wherein rib 102A is arranged nearer the center of ramped surface 102E, complementary surface 502 arranged in a complementary manner on retaining mechanism 105 to engage rib 102A may be sufficient to provide retaining force against illuminator cable 103. Elevational pad 508 may be included in certain embodiments to further ensure a tight fit against illuminator cable 103. That is, one or more of such elevational pads 508 may be arranged about the bottom portion of retaining mechanism 105 to reduce/eliminate any "slop" present when retaining mechanism 105 is in place against illuminator cable 103, thereby allowing a tight fit of retaining mechanism 105 between features of lid assembly 102 (e.g., rib 102A and/or notch 102B) and illuminator cable 103.

Ridge 504 is provided in the exemplary implementation of FIGS. 5A–5C to increase the rigidity of retaining mechanism 105. In alternative embodiments, ridge 504 may be omitted from retaining mechanism 105. Shaped back portion 503, bumper 506, and cut-out portion 509 are features provided in this embodiment in order to aid in the process of coupling retaining mechanism 105 to lid assembly 102 (as discussed more fully below), and such features may be omitted from retaining mechanism 105 in alternative embodiments.

At least one embodiment of the present invention enables a "snap on" Coupling process for retaining mechanism 105, rather than (or in addition to) use of adhesive. Such a snap on coupling process may be simpler and more efficient than application of adhesive. Directing attention back to FIG. 4, one process for coupling retaining mechanism 105 to lid assembly 102 will now be described. Illuminator cable 103 is first positioned on ramped surface 102E of lid assembly 102. In some embodiments, adhesive may be applied to ramped surface 102E and/or illuminator cable 103 to further aid in securing cable 103 to ramped surface 102E, but such adhesive is not required for all embodiments. As mentioned briefly above, nibs 102C and 102D may aid in properly positioning illuminator cable 103 on ramped surface 102E.

Once illuminator cable 103 is in place, retaining mechanism 105 may be applied thereto. One method of applying retaining mechanism 105 follows the process described hereafter. First, retaining mechanism 105 may be positioned lengthwise (in the Y direction of FIG. 4) with jaws 105B and 105C inserted into opening 102G of lid assembly 102. Retaining mechanism 105 may then be adjusted to thread jaws 105B and 105C under rib 102A so that notch 501 is somewhat aligned with nib 102C. Aperture 505 may then be moved to engage (encircle) nib 102D. Cut-out portion 509 may be included to ease in adjusting retaining mechanism 105 over nib 102D. Additionally, bumper 506 may be provided to bump against lid assembly 102 as retaining mechanism 105 is positioned into place, which may provide a positional reference for a manufacturer coupling retaining mechanism 105 to lid assembly 102. Of course, in alternative embodiments, cut-out 509 and/or bumper 506 may be omitted from retaining mechanism 105. Aperture 505 is preferably elliptical shaped, which allows retaining mechanism 105 to be moved somewhat in the X direction (about the width of ramped surface 102E). Accordingly, retaining mechanism 105 is adjusted in the X direction (positive and negative) to position protruding member 507 into notch 102B and align notch 501 with nib 102C. Once this is accomplished, the jaw portion of retaining mechanism 105 is moved to cause notch 501 to engage (snap against) nib 102C. Shaped back portion 503 may be shaped in a manner that aids in grasping retaining mechanism 105 to move notch 501 such that it securely fits against nib 102C. As notch 501 securely fits (e.g., snaps) to nib 102C, complementary surface 502 tightly engages the underside of rib 102A, thereby resulting in retaining mechanism 105 applying force against illuminator cable 103 to retain such cable 103 against ramped surface 102E.

In alternative embodiments, retaining mechanism 105 may have substantially a monkey-wrench shape with only one jaw. That is, lower jaw 105C may be omitted, and retaining mechanism 105 may be arranged such that upper jaw 105B provides positional stability in the positive X direction by engaging nib 102C while aperture 505 provides positional stability in the negative X direction by engaging nib 102D. Alternatively, in some embodiments upper jaw 105B may be omitted, and retaining mechanism 105 may be arranged such that lower jaw 105C provides positional stability in the negative X direction by engaging nib 102C while aperture 505 provides positional stability in the positive X direction by engaging nib 102D.

As shown in FIG. 4, retaining mechanism 105 preferably spans the width of illuminator cable 103. Although, in alternative embodiments, retaining mechanism 105 may span only a portion of the width of illuminator cable 103. As also shown in FIG. 4, retaining mechanism 105 is preferably positioned relatively close to LEDs 104, thereby providing retaining force to the portion of illuminator cable 103 on which LEDs 104 are arranged.

While various embodiments have been described above for retaining an illuminator cable to the surface of a lid assembly of a media picker device, it should be understood that various embodiments for a retaining mechanism may be utilized to retain an illuminator cable to a surface within any other type of device. Additionally, it should be understood that various embodiments for a retaining mechanism may be utilized to retain other types of cables (or other components) to a surface within a device, and any such implementation is intended to be within the scope of the present invention.

It should be recognized that a technical advantage of one aspect of at least one embodiment of the present invention is that a retaining mechanism is provided that retains a first part (e.g., an illuminator cable) to the surface of a second part (e.g., the surface of a lid assembly) to supplement or supplant use of adhesive for retaining such first part to such second part. Additionally, various embodiments of the present invention enable a "snap-connect" implementation for coupling the retaining mechanism into place, which may be a simpler, more effective, and more efficient solution than utilizing adhesive.

What is claimed is:

1. A method of retaining an illuminator cable assembly against a surface of a lid assembly within a media picker device, wherein said lid assembly comprises a rib that is spatially separated from said surface and is oriented above at least a portion of said surface, said method comprising the steps of:
    positioning said illuminator cable assembly on said surface of said lid assembly; and
    arranging a retaining mechanism between said rib and said illuminator cable assembly in a manner such that said retaining mechanism applies sufficient force against said illuminator cable assembly to retain said illuminator cable assembly against said surface.

2. The method of claim 1 where said arranging step further includes the step of:
    engaging a protruding member of said retaining mechanism with a notch of said lid assembly to further apply force against said illuminator cable assembly.

3. The method of claim 2 wherein said rib is off-center of said illuminator cable toward a first side of said illuminator cable assembly and said protruding member engages a notch of said lid assembly oriented on an opposite side of said illuminator cable assembly.

4. The method of claim 1 wherein said arranging step further includes the step of:
    engageably fitting a notch of said retaining mechanism against a nib protruding from said surface of said lid assembly to provide positional stability to said retaining mechanism in at least one direction.

5. The method of claim 1 wherein said surface of said lid assembly is ramped in a manner such that when said illuminator cable assembly is properly retained to said surface of said lid assembly one or more light emitting diodes coupled to said illuminator cable assembly are positioned to direct light therefrom in a desired manner within said media picker device.

6. The method of claim 1 further comprising:
applying adhesive to at least one of said surface of said lid assembly and said illuminator cable assembly to further aid in retaining said illuminator cable assembly to said surface of said lid assembly.

7. A method for retaining a first part against a second part, wherein said second part comprises a surface against which said first part is to be retained and a rib positioned partially above said surface, said method comprising:
positioning said first part on said surface of said second part; and
arranging a retaining mechanism, that comprises a rib engaging surface, a first part engaging surface, and a fixed jaw portion, between said rib and said first part, wherein said arranging comprises
(a) said fixed jaw portion engaging a nib that protrudes from said surface of said second part,
(b) said rib engaging surface engaging said rib, and
(c) said first part engaging surface engaging said first part in a manner such that said retaining mechanism applies sufficient force against said first part to retain said first part against said surface.

8. The method of claim 7 wherein said retaining mechanism further includes a protruding member, and wherein said arranging further comprises:
engaging said protruding member of said retaining mechanism with a notch of said surface of said second part to further apply force against said first part.

9. The method of claim 8 wherein said rib is off-center of said first part toward a first side of said first part, and wherein said protruding member engages said notch of said surface of said second part that is arranged on an opposite side of said first part from said first side.

10. The method of claim 7 wherein said fixed jaw portion engaging said nib that protrudes from said surface of said second part provides positional stability to said retaining mechanism in at least one direction.

11. The method of claim 7 wherein said second part comprises a lid assembly of a media picker and said first part comprises an illuminator cable assembly.

12. A method of retaining an illuminator cable assembly against a surface of a lid assembly within a media picker device, wherein said lid assembly comprises a rib that is spatially separated from said surface, said method comprising the steps of:
positioning said illuminator cable assembly on said surface of said lid assembly; and
arranging a retaining mechanism, that comprises a rib engaging surface, an illuminator cable assembly engaging surface, and a fixed jaw portion, between said rib and said illuminator cable assembly in a manner such that
(a) said fixed jaw portion engages a nib that protrudes from said surface of said lid assembly,
(b) said rib engaging surface engages said rib, and
(c) said illuminator cable assembly engaging surface engages said illuminator cable assembly and applies sufficient force against said illuminator cable assembly to retain said illuminator cable assembly against said surface of said lid assembly.

13. The method of claim 12 where said arranging said retaining mechanism further includes arranging the retaining mechanism in a manner such that a protruding member of said retaining mechanism engages a notch of said lid assembly to further apply force against said illuminator cable assembly.

14. The method of claim 13 wherein said rib is off-center of said illuminator cable toward a first side of said illuminator cable assembly and said protruding member engages a notch of said lid assembly oriented on an opposite side of said illuminator cable assembly.

15. The method of claim 12 wherein said fixed jaw portion engaging said nib that protrudes from said surface of said lid assembly provides positional stability to said retaining mechanism in at least one direction.

16. The method of claim 12 wherein said surface of said lid assembly is ramped in a manner such that when said illuminator cable assembly is properly retained to said surface of said lid assembly one or more light emitting diodes coupled to said illuminator cable assembly are positioned to direct light therefrom in a desired manner within said media picker device.

17. The method of claim 12 further comprising:
applying adhesive to at least one of said surface of said lid assembly and said illuminator cable assembly to further aid in retaining said illuminator cable assembly to said surface of said lid assembly.

* * * * *